United States Patent [19]
Yasuoka

[11] Patent Number: 5,970,948
[45] Date of Patent: Oct. 26, 1999

[54] INTAKE CONTROL SYSTEM FOR ENGINE

[75] Inventor: Masayuki Yasuoka, Yokohama, Japan

[73] Assignee: Nissan Motor Co., Ltd., Yokohama, Japan

[21] Appl. No.: 09/089,365

[22] Filed: Jun. 3, 1998

[30] Foreign Application Priority Data

Jun. 9, 1997 [JP] Japan ................................. 9-151347

[51] Int. Cl.⁶ ............................................. F02B 17/00
[52] U.S. Cl. ........................................... 123/295; 123/308
[58] Field of Search .................................. 123/295, 306, 123/308, 309

[56] References Cited

U.S. PATENT DOCUMENTS

| | | | |
|---|---|---|---|
| 4,651,693 | 3/1987 | Nakajima et al. | 123/306 |
| 4,694,794 | 9/1987 | Kato et al. | 123/306 |
| 4,823,753 | 4/1989 | Murakami et al. | 123/306 |
| 4,998,518 | 3/1991 | Mitsumoto | 123/306 |
| 5,551,392 | 9/1996 | Yamaji et al. | 123/306 |
| 5,575,248 | 11/1996 | Tada | 123/306 |
| 5,640,941 | 6/1997 | Hazen et al. | 123/306 |

*Primary Examiner*—John Kwon
*Attorney, Agent, or Firm*—Foley & Lardner

[57] ABSTRACT

An engine control system for an internal combustion engine of a type having a stratified combustion mode and a homogeneous combustion mode comprises a controller for controlling a swirl flow in the engine with a swirl control valve. The controller effects a changeover of a swirl control mode of the swirl control valve from a weak swirl mode to a strong swirl mode immediately in response to a changeover request signal before an actual changeover of a combustion control mode from the homogeneous combustion mode to the stratified combustion mode. In the case of a changeover from the stratified mode to the homogeneous mode, the controller effects a changeover of the swirl control mode from the strong swirl mode to the weak swirl mode in response to an actual changeover of the combustion control mode, with a delay after the changeover request signal.

22 Claims, 10 Drawing Sheets

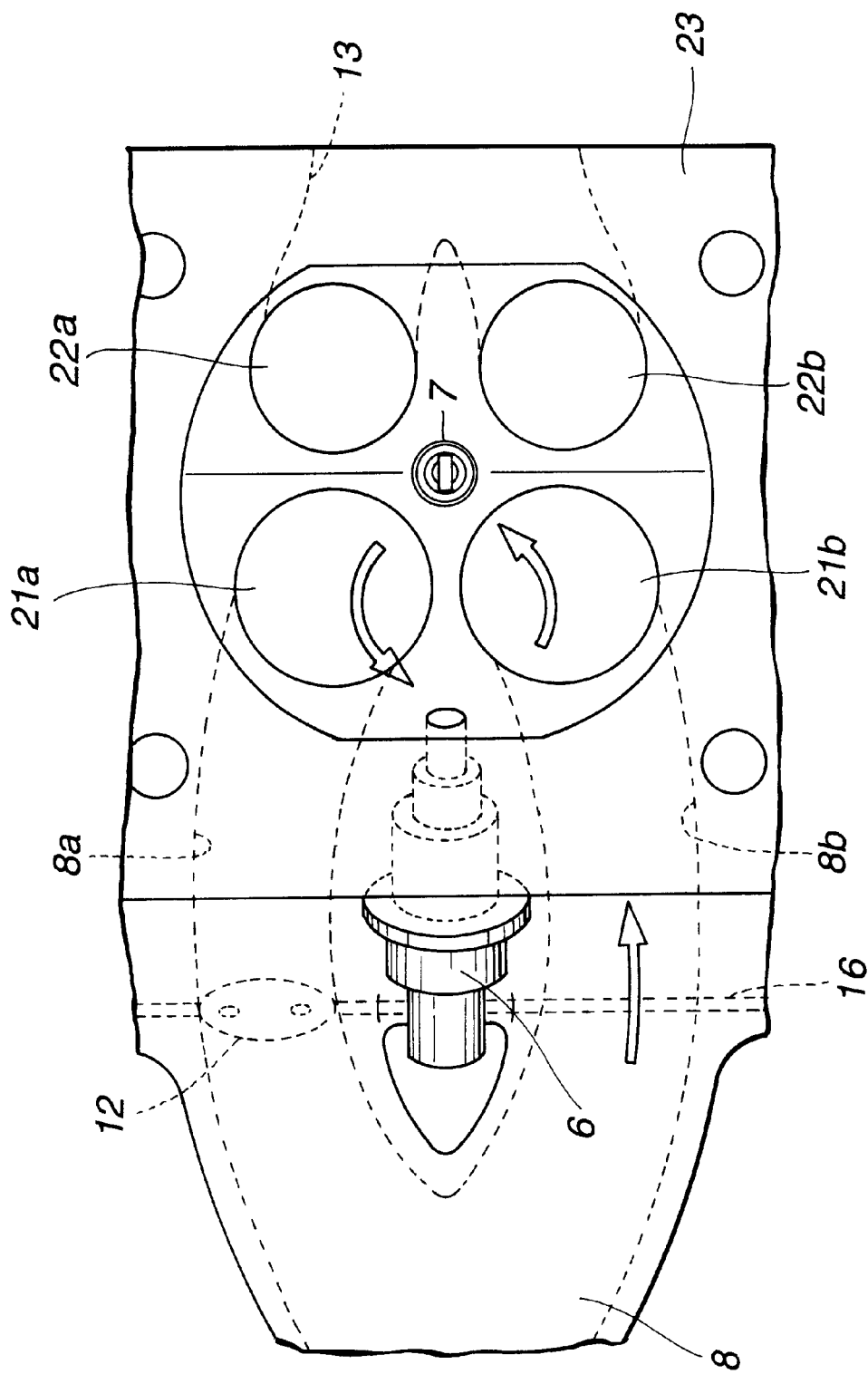

INTAKE CONTROL SYSTEM FOR ENGINE

The contents of a Japanese Patent Application No. 9-151347 with a filing date of Jun. 9, 1997 in Japan are hereby incorporated by reference.

BACKGROUND OF THE INVENTION

The present invention relates to a control system for an internal combustion engine, and more specifically to a control system for controlling a swirl control valve of an intake system for an internal combustion engine of a type having a stratified charge combustion mode and a homogeneous charge combustion mode.

Recently, the technique of in-cylinder direct fuel injection in a spark ignition engine such as gasoline engine is under development to significantly improve the fuel efficiency and emission performance by using stratified charge combustion and homogeneous charge combustion.

In a low and medium load region, a control system for such a type operates an engine in a stratified combustion mode by injecting fuel directly into a combustion chamber during the compression stroke so as to produce a stratified combustible mixture only around the spark plug. The thus-achieved stratified combustion enables stable combustion with an ultra lean mixture, and hence significant improvement in the fuel efficiency and emission performance of the engine.

In a high load region over a predetermined engine load, the engine is operated in a homogeneous combustion mode to meet a demand for higher output torque. In the homogeneous combustion mode, fuel is injected during the intake stroke so as to produce a homogeneous air fuel mixture. (In some examples, a fuel injection valve is provided separately in an intake port.)

The control system changes over the combustion control mode between the stratified combustion mode and the homogeneous combustion in accordance with one or more engine operating conditions.

An in-cylinder air flow condition is important to create a stratified mixture efficiently in a combustion chamber in the stratified combustion mode. A swirl control valve is a device disposed in or near an intake port, for regulating an intake air flow to control the in-cylinder air flow condition. In the stratified combustion mode, the swirl control valve throttles the intake air flow by decreasing its opening and thereby help create a strong swirl to achieve the stratified combustion. In the homogeneous combustion mode in which such a strong swirl is not needed, the opening of the swirl control valve is switched to an opening degree adapted to the homogeneous combustion mode.

Japanese Patent Provisional (Kokai) Publication No. 7(1995)-293260 shows a swirl control system for changing over the opening of a swirl control valve between an opening degree desired for the stratified combustion mode and a degree for the homogeneous combustion mode. This swirl control system closes the swirl control valve to produce the swirl flow in the stratified combustion mode, and in the homogeneous combustion mode in a high load operating region excepting a region near full throttle. The swirl control valve is fully open in the homogeneous combustion mode in the high load operating region near the full throttle.

SUMMARY OF THE INVENTION

It is an object of the present invention to provide an engine control system capable of changing over a swirl control mode more adequately to ensure a stable combustion in a transient period from one combustion mode to the other.

The control system can prevent deterioration in combustion due to a lag in operation of a swirl control valve as in the above-mentioned conventional swirl control system, specifically in transition from homogeneous full throttle combustion to stratified combustion.

According to the present invention, an engine control system comprises an internal combustion engine of a type having at least a first system for controlling a combustion condition in the engine by changing over a combustion control mode between a stratified combustion mode and a homogeneous combustion mode, and a second system for controlling a swirl condition of a swirl flow in the engine by regulating an intake air flow into the engine; and a controller for controlling the swirl condition of the engine to adapt the swirl condition to the combustion condition of the engine by changing over a swirl control mode between a stratifying mode for the stratified combustion mode and a homogenizing mode for the homogeneous combustion mode, and for changing a swirl control changeover timing of changeover of the swirl control mode between the stratifying mode and the homogenizing mode in accordance with a changeover direction which is one of a first direction from the homogeneous combustion mode to the stratified combustion mode and a second direction from the stratified combustion mode to the homogeneous combustion mode.

An engine control process for such an engine according to the present invention comprises at least a controlling step and a changing step. The controlling step is for controlling the swirl condition of the engine to adapt the swirl condition to the combustion condition of the engine by changing over the swirl control mode between the stratifying mode for the stratified combustion mode and the homogenizing mode for the homogeneous combustion mode. The changing step is for changing a swirl control changeover timing of changeover of the swirl control mode between the stratifying mode and the homogenizing mode in accordance with the changeover direction.

The above-mentioned first system of the engine may comprise at least one of a fuel system and an ignition system, and the second system may comprise an intake system.

When the combustion condition is to be changed from homogeneous combustion to stratified combustion, the engine control system or process can prevent undesired influence due to a delay by advancing the swirl control changeover timing to the opening degree for the stratified combustion mode (the minimum opening, for example) to effect a start of a changeover of the swirl control mode in advance of a changeover of the combustion control mode.

When, on the other hand, the combustion condition is to be changed from stratified combustion to homogeneous combustion, the control system or process can retard the swirl control changeover timing to delay a start of the changeover of the swirl control mode until the changeover of the combustion control mode. The control system or process ensures the combustion stability by maintaining a strong swirl as long as the actual combustion is in the stratified form, and rather allows a strong swirl to linger after an actual changeover to the homogeneous combustion. In the homogeneous combustion, a stronger swirl lasting for a short time is not so problematical to the combustibility.

BRIEF DESCRIPTION OF THE DRAWINGS

FIGS. 2A and 2B are schematic views showing an engine control system according to one embodiment of the present invention.

DETAILED DESCRIPTION OF THE INVENTION

Figure 2A:
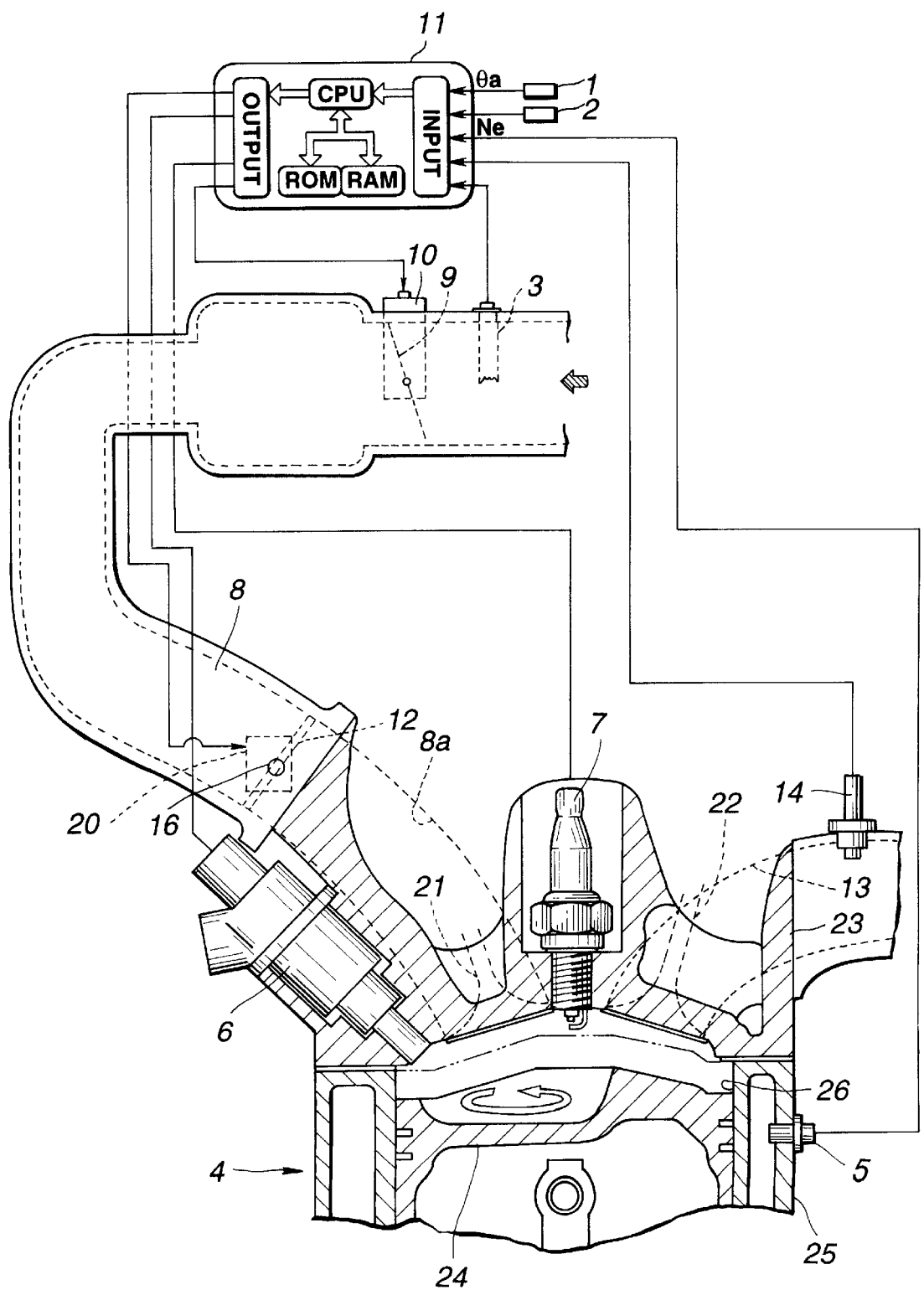

FIGS. 2A and 2B show an engine control system according to one embodiment of the present invention.

The engine control system comprises an input section including a group of sensors, a control section and an output section including devices serving as actuators of the control system.

The input section of this example comprises an accelerator position sensor 1 for sensing a position of an accelerating system of an internal combustion engine 4, a crank angle sensor 2, an air flow sensor (or meter) 3 for sensing an intake air quantity for the engine 4, and a water temperature sensor 5 for sensing the temperature of an engine cooling water. The accelerator sensor 1 of this example senses an opening degree (or a depression degree) of an accelerator pedal of the vehicle. The crank angle sensor 2 of this example produces a position signal signaling each unit crank angle, and a reference signal signaling each cylinder stroke phase difference. The control system can sense the engine speed by measuring the number of pulses per unit time of the position signal, or measuring the period of occurrence of pulses of the reference signal.

The engine 4 comprises a fuel injector 6 and a spark plug 7 for each cylinder. The fuel injector 6 of each cylinder injects fuel directly into the combustion chamber of the engine 4 in response to a fuel injection control signal, and the spark plug 7 initiates ignition in the combustion chamber. A throttle valve 9 is disposed in an intake air passage 8 of the engine 4. A throttle control unit 10 is arranged to electronically control the opening degree of a throttle valve 10 with a throttle actuator such as a DC motor. The throttle valve 9 serves as an intake air metering valve for controlling a fresh intake air quantity to the engine 4. The fuel injectors 6 are controlled in one of a stratified combustion mode and a homogeneous combustion mode. In the stratified combustion mode, the fuel injector 6 of each cylinder injects the fuel into the combustion chamber in the compression stroke to achieve stratified combustion with a very lean air fuel mixture. Under high load conditions, the fuel injector 6 of each cylinder is controlled in the homogeneous combustion mode, and injects fuel into the combustion chamber in the intake stroke to achieve homogeneous combustion to provide more power output. The fuel injectors 6 serve as an actuator for controlling the combustion condition in the engine.

A control unit 11 receives signals from the input section to collect input information on engine operating conditions, and controls the opening degree of the throttle valve 9 through the throttle control unit 10, the fuel injection quantity (or fuel supply quantity) and timing of each fuel injector 6 and the ignition timing of each spark plug 7 in accordance with the engine operating conditions.

The control unit 11 is a main member in the control section of the control system. In this example, the control unit 11 includes at least one computer including at least a central processing unit (CPU), a memory section having ROM and RAM and input and output sections, as shown in FIG. 2A.

A swirl control valve 12 is disposed in the intake passage 8 of the intake system of the engine 4. The swirl control valve 12 of this example is disposed in or near an intake port of the intake passage 8. The swirl control valve 12 varies its own opening degree and thereby controls the strength of swirl flow in the combustion chamber. The swirl control valve 12 is connected, by a shaft 16 shown in FIG. 2A, with an actuator 20. In this example, the actuator 20 is a stepper motor.

The control unit 11 calculates a target intake air quantity from the accelerator opening Oa and the engine revolution speed Ne, and controls the opening degree of the throttle valve 9 to achieve the target intake air quantity by delivering a drive signal to the throttle control unit 10. The control unit 11 further controls the opening degree of the swirl control valve 12, and thereby varies the swirl condition of the intake air to adjust the swirling strength to a level suitable for the stratified combustion or to a level suitable for the homogeneous combustion. For example, the control unit 11 increases the swirling strength to produce a stratified air fuel mixture in the combustion chamber in the stratified combustion mode whereas generation of swirl is not required in the homogeneous combustion mode under high load conditions.

The input section of this example further includes an air fuel ratio sensor 14 provided in an exhaust passage 13 of the engine, for sensing the air fuel ratio of the air fuel mixture by sensing a concentration of a predetermined component such as oxygen in the exhaust gas mixture.

The internal combustion engine 4 of this example comprises an engine block assembly of a cylinder head 23 and a cylinder block 25 defining a plurality of engine cylinders arranged in a line. A piston 24 is slidable in each cylinder. As shown in FIG. 2B, the engine of this example has a pair of first and second intake valves 21a and 21b and a pair of first and second exhaust valves 22a and 22b for each engine cylinder. The intake air passage 8 shown in FIGS. 2A and 2B bifurcates into first and second branch passages. In this example, the first branch passage has an upstream passage section and a downstream passage section which is defined by a first intake port 8a formed in the cylinder head 23. Similarly, the second branch passage has an upstream passage section and a downstream passage section defined by a second intake port 8b in the cylinder head 23. The first intake valve 21a is centered in the first intake port 8a, and the second intake valve 21b is centered in the second intake port 8b. The swirl control valve 12 of this example is disposed at a position to regulate the intake air flow through the first intake port 8a. In this example, the swirl control valve 12 is disposed in the first branch passage of the intake air passage 8.

Figure 3:
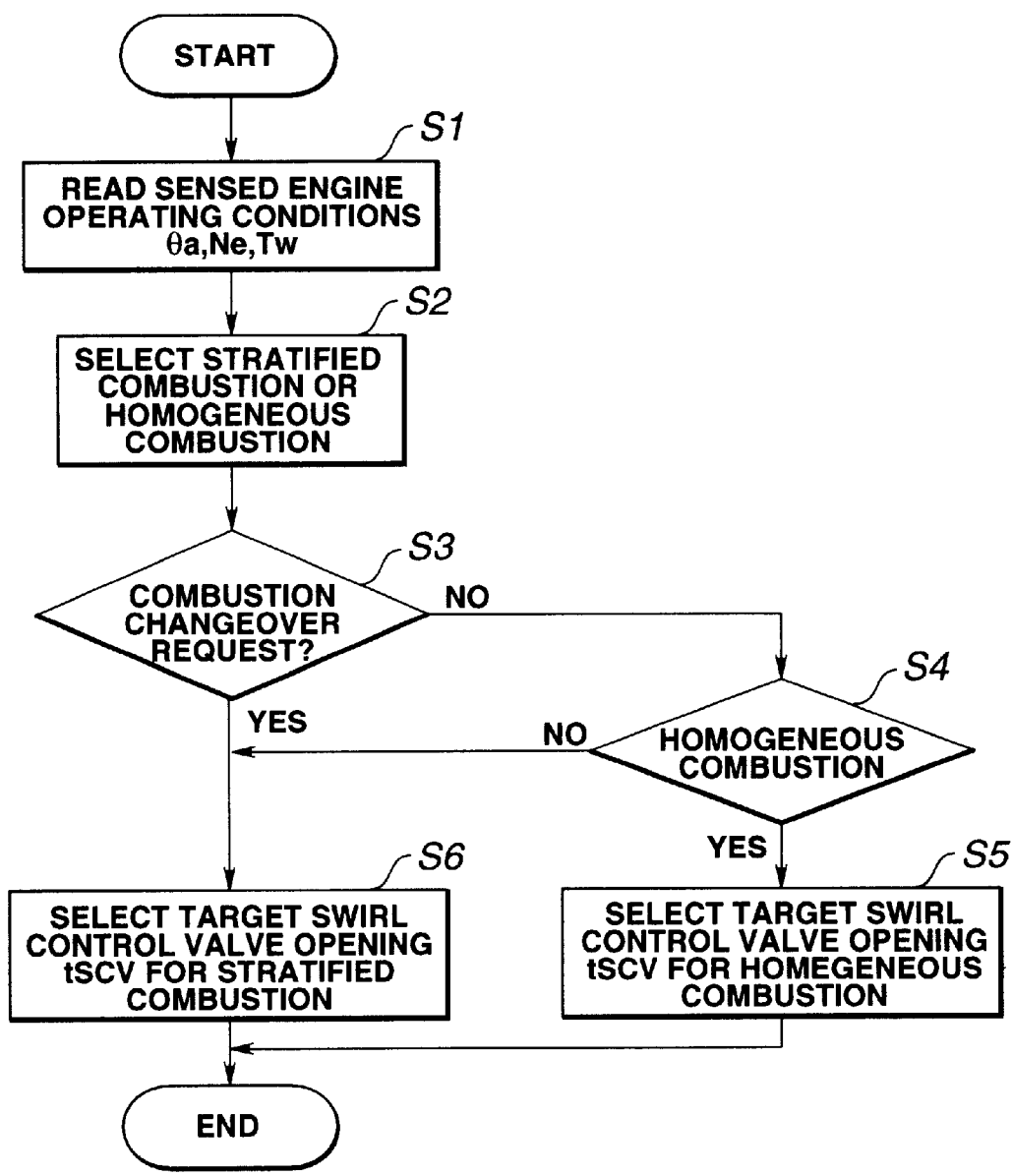
FIG. 3 is a flow chart showing a swirl control routine in a first example according to the embodiment.

FIG. 3 shows a SCV changeover timing control procedure performed by the control unit 11.

At a step S1, the control unit 11 reads the sensed engine operating conditions, such as the accelerator opening (or depression) degree θa, the engine speed Ne, and the engine coolant temperature Tw, supplied from the input section.

At a step S2, the control unit 11 selects, as a desired target combustion mode, one of the stratified combustion mode and the homogeneous combustion mode in accordance with the sensed engine operating conditions.

At a step S3, the control unit 11 determines whether there exists a combustion mode changeover request for a combustion mode changeover between the stratified combustion mode and the homogeneous combustion mode. The control system does not carry out a changeover of the actual combustion immediately upon receipt of the mode change request in order to prevent a step change in torque due to a response delay in the intake air quantity. The control system varies the equivalent ratio gradually to a new target value, and performs an actual changeover of the combustion at such a timing as not to cause a step torque change.

In this example, the control unit 11 switches a first target combustion condition flag FSTR1 immediately when the combustion mode change request is generated in accordance with the engine operating conditions, and thereafter switches a second target combustion condition flag FSTR2 when the combustion is actually changed. In this example, the first flag FSTR1 is zero for the homogeneous combustion, and one for the stratified combustion, and the second flag FSTR2 is also zero for the homogeneous combustion, and one for the stratified combustion. In this example, the combustion mode changeover request exists during the period from the generation of the combustion mode changeover request to the actual changeover of the combustion. That is, the combustion mode changeover request exists while the first and second target combustion condition flags FSTR1 and FSTR2 are not equal to each other.

When there is no combustion mode changeover request, the control unit 11 proceeds from the step S3 to a step S4. At the step S4, the control unit 11 determines whether the current combustion mode is the homogeneous combustion mode or not, for example by checking whether the second flag FSTR2 is zero. If it is, the control unit 11 proceeds to a step S5, and sets a target swirl control valve opening degree tSCV to a larger level (to fully open the swirl control valve 12 under high load conditions) by selecting a homogeneous mode value of the target opening degree tSCV suitable to the homogeneous combustion. If the current mode is the stratified combustion mode, the control unit 11 proceeds from the step S4 to a step S6 and sets the target swirl control valve opening degree tSCV to a smaller level by selecting a stratified mode value of the target opening degree tSCV suitable to the stratified combustion.

When there exists the combustion mode changeover request, the control unit 11 proceeds from the step S3 to the step S6, and sets the target swirl control valve opening degree tSCV to the stratified mode value for the stratified combustion. That is, the target swirl control valve opening degree tSCV is held at the stratified mode value during the period from the generation of the combustion mode change request to the actual changeover of the combustion.

Figure 4:
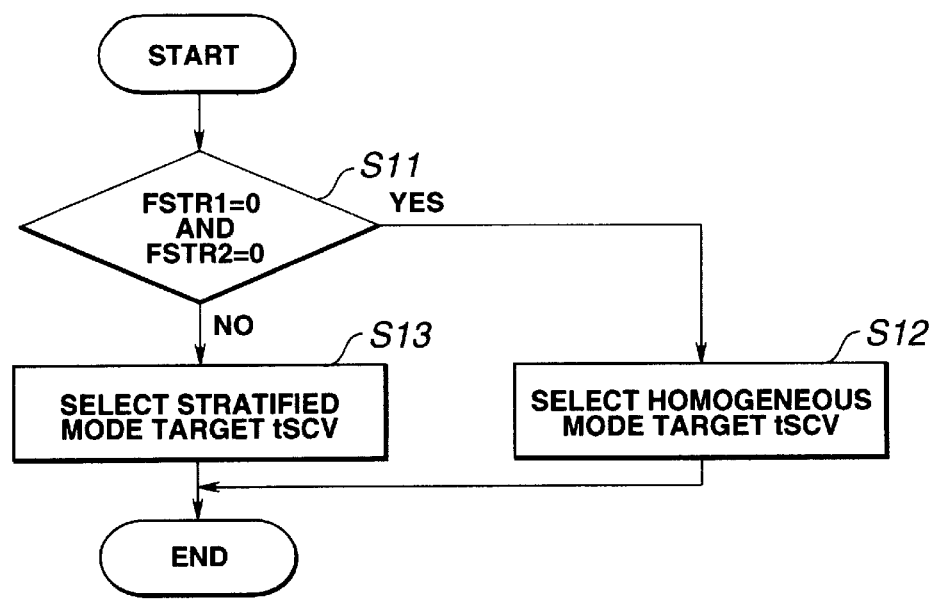
FIG. 4 is a flow chart showing a variation of the swirl control routine of FIG. 3.

FIG. 4 shows a variation of the SCV changeover timing control procedure performed by the control unit 11. In the control logic of FIG. 4, the control unit 11 determines at a step S11 whether the first and second target combustion condition flags FSTR1 and FSTR2 are both equal to zero or not. If they are equal to zero, the control unit 11 proceeds to a step S12, and sets the target SCV opening degree tSCV to the homogeneous mode opening value at the step S12. If either or both of the first and second target combustion condition flags FSTR1 and FSTR2 is equal to one, then the control unit 11 proceeds from the step S11 to a step S13, and sets the target SCV opening degree tSCV to the stratified mode value.

Figure 5:
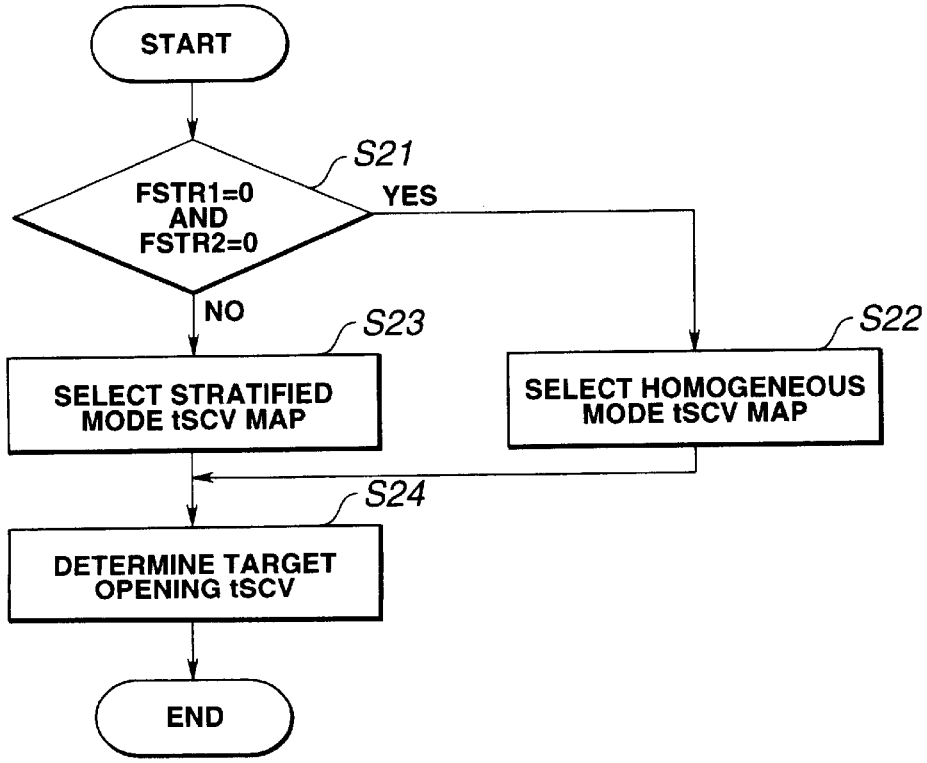
FIG. 5 is a flow chart showing a second variation of the swirl control routine of FIG. 3.

FIG. 5 shows another variation of the SCV changeover timing control procedure performed by the control unit 11. At a step S21, the control unit 11 determines, as in the step S11, whether the first and second target combustion condition flags FSTR1 and FSTR2 are both equal to zero or not. If both are equal to zero, the control unit 11 proceeds to a step S22, and selects a map of the homogeneous mode target SCV opening degree tSCV at the step S22. If at least one of the first and second target combustion condition flags FSTR1 and FSTR2 is equal to one, then the control unit 11 proceeds from the step S21 to a step S23, and selects a map of the stratified mode target SCV opening degree tSCV at the step S23. Then, at a step S24, the control unit 11 determines a value of the target SCV opening degree tSCV in accordance with at least one engine operating condition by using a selected one of the maps.

In these processes according to the embodiment of the present invention, the control system differentiates the changeover timing of the swirl control between the changeover from the stratified combustion to the homogeneous combustion and the changeover from the homogeneous combustion to the stratified combustion. In the former case of changeover from the stratified combustion to the homogeneous combustion, the control system holds the swirl control valve at the target of the stratified combustion from generation of the combustion mode changeover request to actual changeover to the homogeneous combustion. Thereafter, the control system changes the target SCV opening degree to the homogeneous mode target after actual changeover to the homogeneous combustion.

In the case of changeover from the homogeneous combustion to the stratified combustion, the control system changes the target SCV opening degree to the stratified mode target immediately upon receipt of the mode change request from the homogeneous combustion to the stratified combustion mode, and holds the target SCV opening at the stratified mode target even after the actual changeover to the stratified combustion.

Figure 6:
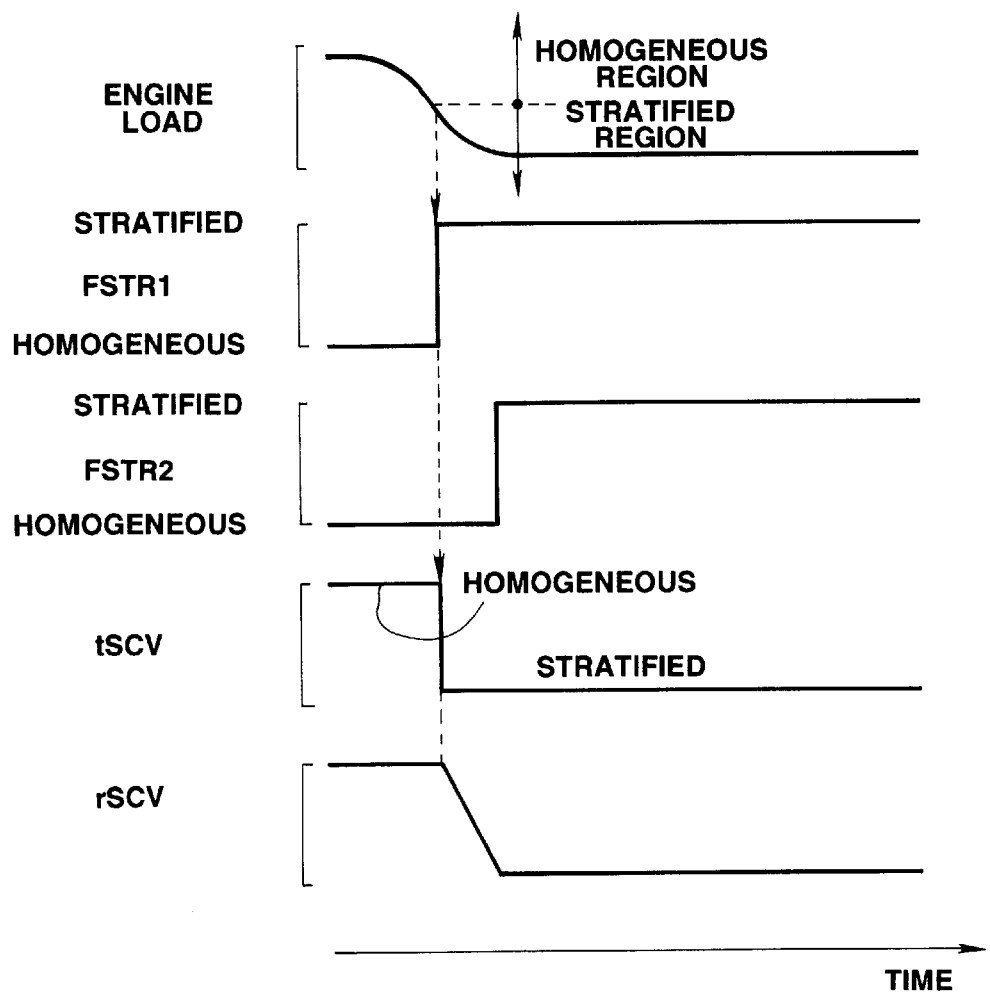
FIG. 6 is a time chart showing variables varying with time to illustrate time dependent events occurring in the control system according to the embodiment in the case of changeover from homogeneous combustion to stratified combustion.
Figure 7:
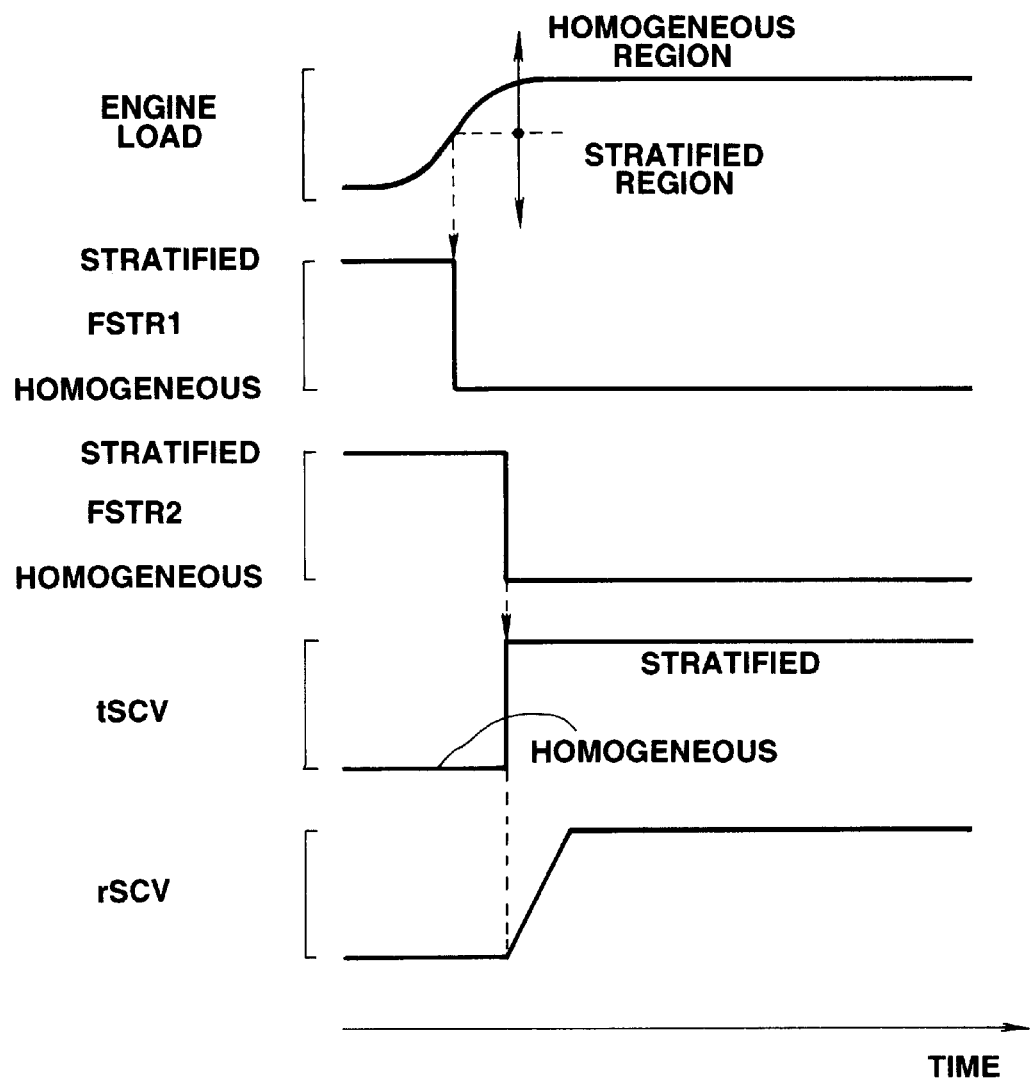
FIG. 7 is a time chart of the variables shown in FIG. 6 in the case of changeover from stratified combustion to homogeneous combustion.

FIGS. 6 and 7 illustrate operations of the control system according to the first practical example.

There is a time delay from a change in the target SCV opening to completion of an actual change of the actual SCV opening of the swirl control valve 12 driven by the actuator such as a step motor. The stratified combustion requires the swirl control valve 12 to produce a strong swirl motion with a stratified mode target opening (minimum opening degree, for example) to secure stable stratified combustion. On the other hand, the homogeneous combustion does not require a strong swirl motion, but a swirl temporarily lingering due to an actuating delay of the swirl control valve 12 is not so harmful to the homogeneous combustion.

Therefore, in the case of changeover from the homogeneous combustion to the stratified combustion, as shown in FIG. 6, the control system changes the target SCV opening tSCV from the homogeneous level to the stratified mode level simultaneously with generation of the mode change request to the stratified mode. Therefore, the actual SCV opening rSCV is varied to the stratified level before the actual changeover to the stratified combustion. The swirl control valve 12 can produce a strong swirl needed for satisfactory stratified combustion without delay immediately after the actual changeover to the stratified combustion.

In the case of changeover from the stratified combustion to the homogeneous combustion, as shown in FIG. 7, the control system holds the SCV opening at the target SCV opening of the stratified mode while the actual combustion is still in the stratified mode, and increases the target SCV opening tSCV to the homogeneous mode level simultaneously with actual changeover to the homogeneous combustion. The actual SCV opening reaches the homogeneous mode target level with a delay due to actuating delay. This delay causes a relatively strong swirl motion to stay behind after the changeover to the homogeneous mode. However, this temporal swirl is not influential in performance of homogeneous combustion.

Figure 8:
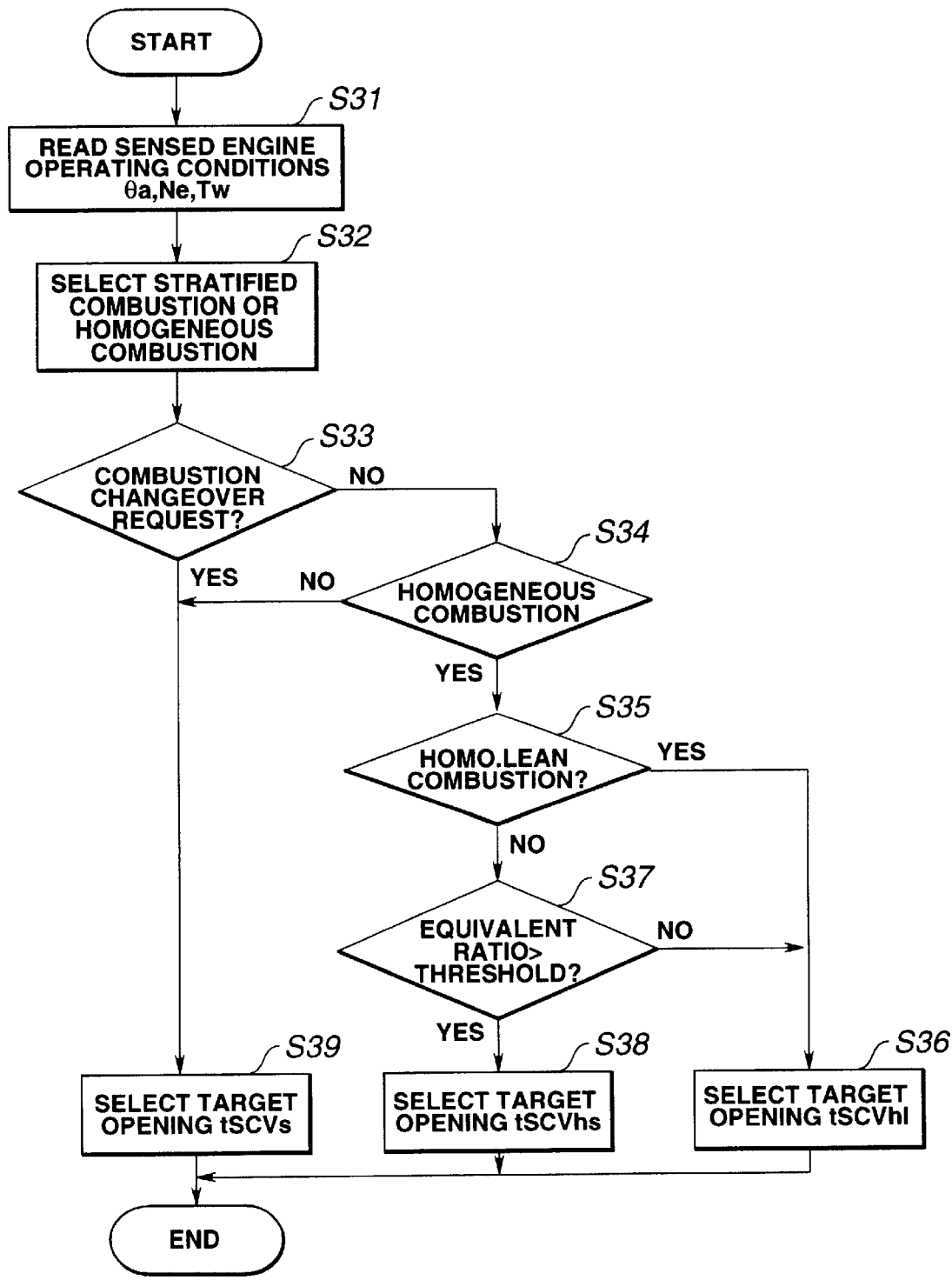
FIG. 8 is a flow chart showing a swirl control routine in a second example according to the embodiment.

FIG. 8 shows a SCV opening changeover control procedure according to a second example of the embodiment of the present invention. In the second example, the control system has the stratified combustion mode as in the preceding embodiment. In addition, the control system of the second example has two different homogeneous combustion modes; a homogeneous stoichiometric (or richer) combustion mode for producing homogeneous combustion at or near a theoretical air fuel ratio, and a homogeneous lean combustion mode for producing homogeneous combustion at a leaner air fuel ratio (of about 20). The control system switches the combustion mode among these three different combustion modes, in accordance with the engine operating conditions. FIG. 8 shows the procedure for setting the target SCV opening degree to one of a homogeneous lean combustion mode target SCV opening degree tSCVhl adapted to the homogeneous lean combustion, a homogeneous stoichiometric combustion mode target SCV opening degree tSCVhs adapted to the homogeneous stoichiometric combustion and a stratified combustion mode target SCV opening degree tSCVs adapted to the stratified combustion.

Steps S31~S34 are substantially identical to the steps S1~S4 of FIG. 2.

A step S35 is reached when the control unit 11 judges at the step S34 that the current combustion is homogeneous combustion. At the step S35, the control unit 11 checks a flag FLEAN, and thereby determines whether the target combustion mode is the homogeneous lean combustion mode, or not (the homogeneous stoichiometric combustion mode). The flag FLEAN is a condition code set and reset in accordance with the engine operating conditions.

When the target is the homogeneous lean combustion, the control unit 11 proceeds from the step S35 to a step S36, and selects the target SCV opening degree tSCVhl for the homogeneous lean combustion mode at the step S36. In order to produce a swirl to some extent to promote mixing in the homogeneous lean combustion, the homogeneous lean combustion mode target SCV opening degree tSCVhl is set at an intermediate level between the stratified combustion mode target SCV opening degree tSCVs (a minimum opening degree, for example) and the homogeneous stoichiometric combustion mode target SCV opening degree tSCVhs (a full opening, for example).

When the target is the homogeneous stoichiometric combustion, the control unit 11 proceeds from the step S35 to a step S37, and determines at the step S37 whether the equivalent ratio is equal to or greater than a predetermined lower limit value (or threshold value TFBYAO) required to allow the homogeneous stoichiometric combustion mode SCV opening degree (for example, the maximum opening degree to fully open the swirl control valve). In steady state homogeneous stoichiometric combustion at the theoretical air fuel ratio, the equivalent ratio is set greater than the predetermined lower limit value. However, in transition from the stratified combustion to the homogeneous stoichiometric combustion, in order to vary the torque smoothly, the control system of this example increases the equivalent ratio gradually and continues increasing the equivalent ratio to the target theoretical air fuel ratio even after changeover of the actual combustion to the homogeneous combustion. Therefore, when the equivalent ratio is still too small as compared with the equivalent ratio for the homogeneous stoichiometric combustion, and the actual combustion is still in the form of the homogeneous lean combustion, the control system waits, without immediately changing the swirl control valve opening to the opening degree of the homogeneous stoichiometric combustion, until the equivalent ratio reaches the predetermined lower limit value. Too early changeover to the opening degree of the homogeneous stoichiometric combustion would deteriorate the quality of combustion because of too weak swirl and poor mixability. To prevent such deterioration, the control system sets the target SCV opening tSCV to the homogeneous lean mode degree tSCVhl at the step S36 until the equivalent ratio becomes equal to the predetermined lower limit. When the equivalent ratio becomes greater than the predetermined value, the control system proceeds from the step S37 to a step S38, and changes over the target SCV opening tSCV to the opening degree tSCVhs of the homogeneous stoichiometric combustion.

When the answer of the step S33 is affirmative because of the existence of a combustion changeover request, or when the answer of the step S34 is negative because of judgement that the actual combustion is the stratified form, the control system proceeds to a step S39 and thereby selects the target opening degree tSCVs for the stratified combustion mode.

Figure 9:
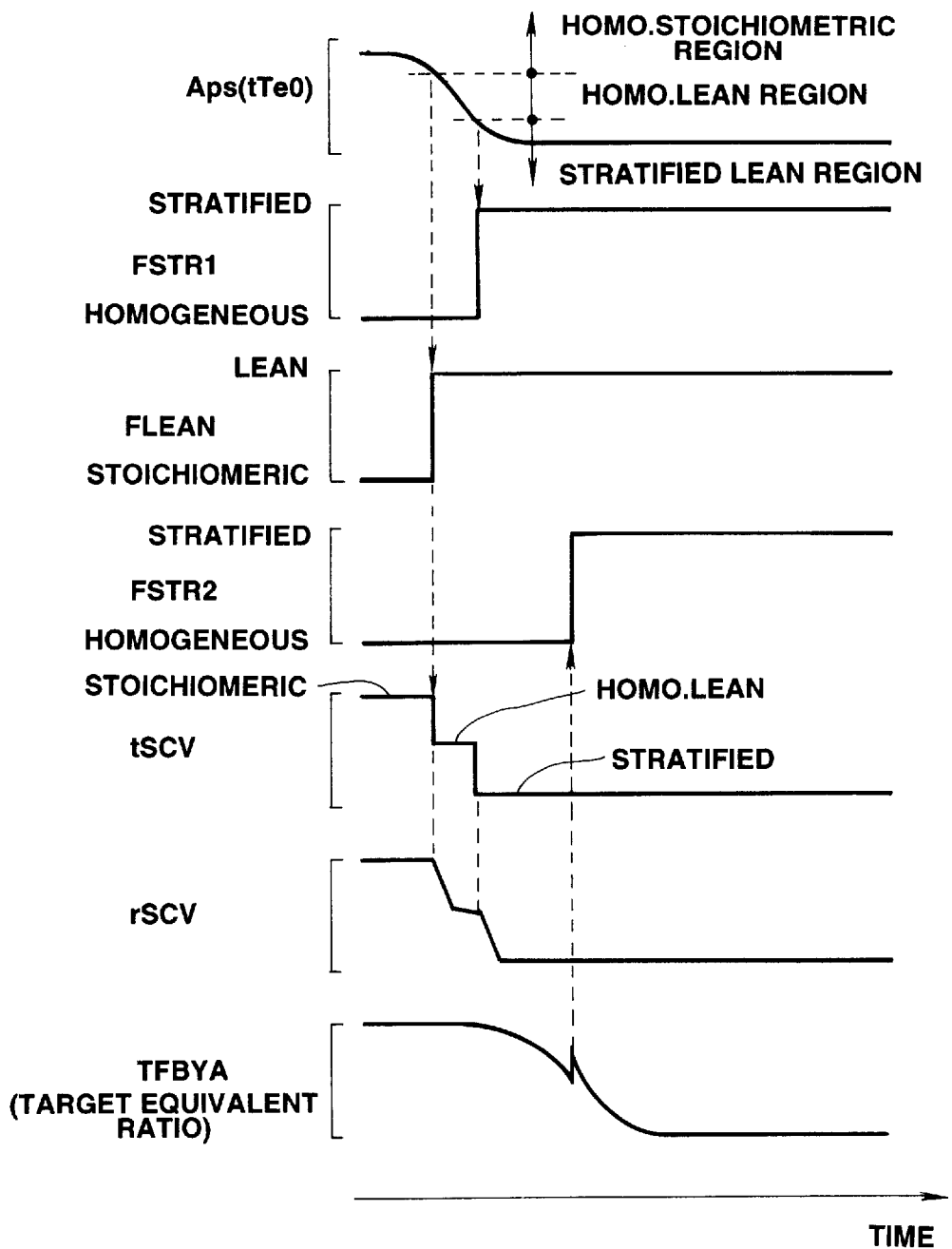
FIG. 9 is a time chart showing variables varying with time to illustrate time dependent events occurring in the second practical example according to the embodiment in the case of changeover from homogeneous stoichiometric combustion mode to stratified combustion.
Figure 10:
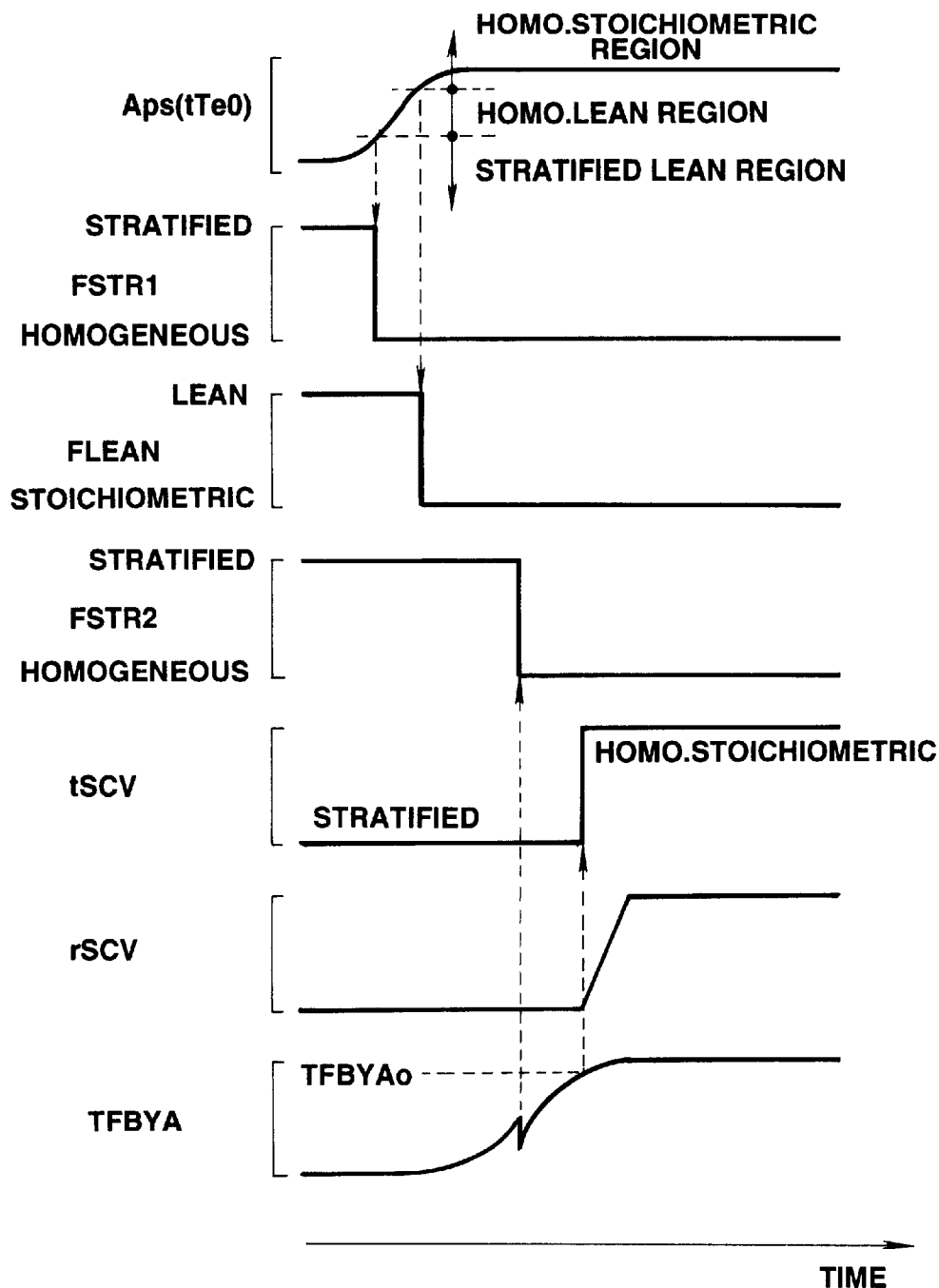
FIG. 10 is a time chart of the variables show in FIG. 9 in the case of changeover from stratified combustion to homogeneous stoichiometric combustion.

FIGS. 9 and 10 show operations of the control system of the second practical example.

FIG. 9 shows a changeover operation from the homogeneous stoichiometric combustion mode to the stratified combustion mode. The control unit 11 monitors a predetermined engine operating parameter indicative of engine load, determined in accordance with one or more sensed engine operating conditions. For example, the engine operating parameter is a variable representing a target engine torque tTe0 which is determined in accordance with the accelerator opening Aps and the engine speed Ne. When, for example, the target engine torque tTe0 decreases from a predetermined first region for the homogeneous stoichiometric combustion mode to a predetermined second region for the homogeneous lean combustion mode, with a decrease in the accelerator opening, then the control unit 11 changes the target combustion mode from the homogeneous stoichiometric combustion mode to the homogeneous lean combustion mode by changing the third combustion condition flag FLEAN from a level indicating the stoichiometric mode, to a level of the homogeneous lean mode. At the same time, the control unit 11 decreases the target swirl control valve opening tSCV from the first target opening degree tSCVhs for the homogeneous stoichiometric mode to the second target opening degree tSCVhl adapted to the homogeneous lean combustion mode. Accordingly, the actual opening degree rSCV of the swirl control valve 12 starts decreasing at that instant, and decreases gradually to the target opening degree tSCVhl for the homogeneous lean combustion, as shown in FIG. 9.

When the combustion condition is changed from the homogeneous stoichiometric combustion to the homogeneous lean combustion, the control system thus changes the target swirl control valve opening tSCV from the high degree tSCVhs to the intermediate degree tSCVhl and controls the swirl condition adequately to always ensure satisfactory combustion.

When the load indicative engine operating parameter further varies from the second region of the homogeneous lean mode to a predetermined third region of the stratified combustion mode, a combustion changeover request is generated, and the first target combustion condition flag FSTR1 is changed from the value of the homogeneous combustion to the value of the stratified combustion. At this instant, the control system changes over the target SCV opening tSCV from the homogeneous lean mode target opening degree tSCVhl to the stratified mode target SCV opening degree tSCVs. Therefore, the actual opening rSCV of the swirl control valve 12 decreases to the stratified mode target SCV opening degree tSCVs, as shown in FIG. 9.

The control system decreases the actual equivalent ratio gradually by decreasing a target equivalent ratio TFBYA, as shown in FIG. 9. Then, the control system changes the actual combustion from the homogeneous mode to the stratified mode. Before the actual changeover of the combustion mode to the stratified mode, the actual opening rSCV of the swirl control valve 12 has reached the stratified mode target SCV opening degree tSCVs, as shown in FIG. 9. The control system can switch the combustion to the stratified mode smoothly by providing a strong swirl suitable for the stratified combustion from a start of the stratified combustion without delay.

FIG. 10 shows a changeover operation from the stratified combustion mode to the homogeneous stoichiometric combustion mode.

In accordance with an increase in the target engine torque tTe0, the control system first changes the first target combustion condition flag FSTR1 from the value of the stratified mode to the value of the homogeneous mode to signal a combustion changeover request. Then, the third flag FLEAN is changed from the lean mode value to the stoichiometric mode value in accordance with the changeover from the homogeneous lean combustion to the homogeneous stoichiometric combustion. Finally, the second flag FSTR2 is changed from the stratified mode value to the homogeneous mode value. However, the control system continues holding the target swirl control valve opening tSCV at the stratified mode degree tSCVs.

With increase in the target engine torque tTe0, the target equivalent ratio TFBYA is increased as shown in FIG. 10. When the target equivalent ratio TFBYA reaches the predetermined value TFBYAo, the control system changes the target swirl control valve opening tSCV to the stoichiometric mode opening degree tSCVhs. Accordingly, the actual SCV opening rSCV is increased to the degree tSCVhs (the maximum full opening degree, for example). Thus, the control system maintains the quality of combustion by holding the opening of the swirl control valve at the small degree for the stratified mode, even after the changeover of the actual combustion to the homogeneous combustion, until the target equivalent ratio becomes sufficiently high.

The present invention is applicable to engines of various types. For example, an engine usable in the invention comprises an engine block assembly of a cylinder block, a cylinder head, etc., a first system for controlling the combustion condition in each cylinder of the engine, and for changing over the combustion control mode between the stratified combustion mode and the homogeneous combustion mode, and a second system for controlling the swirl condition of a swirl flow in each engine cylinder by regulating an intake air flow into each engine cylinder.

The first system of the engine may comprise at least one of a fuel system and an ignition system, and the second system may comprise an intake system. In one example shown in FIG. 1, the first system includes a fuel system 201 such as a fuel injection system and an ignition system 202. The second system is an intake system including at least a swirl control actuator 203. The illustrated embodiment is constructed in the same manner. The fuel injectors 6 are component of the fuel system, and the spark plugs 7 are components of the ignition system. The intake system comprises items 8, 9, 12 etc.

In the illustrated embodiment of the invention, at least one of the swirl control valve 12 and its actuator 20 serves as the swirl control actuator 203.

Figure 1:
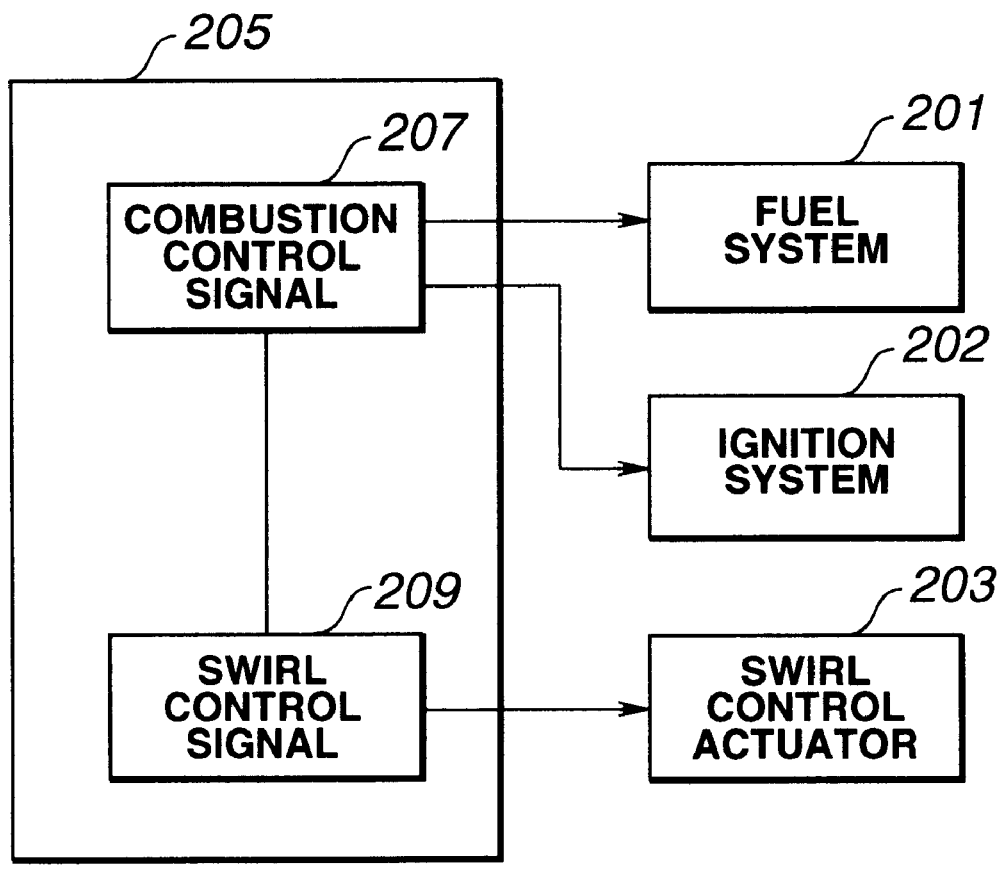
FIG. 1 is a block diagram showing basic configuration and function of the present invention.

In the example shown in FIG. 1, the controller comprises a first section 207 and a second section 209. The first section 207 is a section for producing at least one combustion control signal, such as a control signal for controlling fuel injection timing and fuel injection quantity and/or a control signal for controlling ignition timing, and for changing over the combustion between stratified combustion and homogeneous combustion by changing the control mode of the control signal. For example, the first section 207 changes over the combustion control mode, by changing the fuel injection timing between a timing for the stratified combustion and a timing for the homogeneous combustion. The second section 209 produces a swirl control signal to control the swirl condition with the swirl control actuator 203. The second section 209 achieves the desired target SCV opening by sending the swirl control signal representing the target opening to the actuator 203. It is possible to add a step S7 to the flow chart of FIG. 3 at a position following the step S6 and S5, just before the ending section. In this case, the control unit 11 proceeds from the step S6 or S5 to the step S7, and produces the swirl control signal representing the target swirl control valve opening degree selected at the step S5 or S6, and then terminates this routine.

The control system may be mounted on a vehicle. Preferably, the controller comprises at least one onboard computer. The first and second sections 207 and 209 may be two sections in one computer module, or may be two separate computer modules.

In one example, the controller determines a first engine operating parameter and a second engine operating parameter in accordance with the sensed engine operating conditions. The controller produces a combustion changeover request signal when the first parameter varies from one predetermined region to another predetermined region, and thereafter changes over the combustion mode in response to the request signal when the second parameter varies from one predetermined region to another predetermined region. The first parameter may be a parameter indicative of engine load, such as the calculated target engine torque. The second parameter may be a parameter indicative of the target equivalent ratio determined in accordance with the engine operating conditions. The controller may be configured to synchronize the target equivalent ratio with the phase of the intake air quantity in transition from one combustion mode to another.

What is claimed is:

1. An engine control system comprising:

an internal combustion engine comprising a first system for controlling a combustion condition in the engine by changing over a combustion control mode between a stratified combustion mode and a homogeneous combustion mode, and a second system for controlling a swirl condition of a swirl flow in the engine by regulating an intake air flow into the engine; and a controller for controlling the swirl condition of the engine to adapt the swirl condition to the combustion condition of the engine by changing over a swirl control mode between a stratifying mode for the stratified combustion mode and a homogenizing mode for the homogeneous combustion mode, and for changing a swirl control changeover timing of changeover of the swirl control mode between the stratifying mode and the homogenizing mode in accordance with a changeover direction which is one of a first direction from the homogeneous combustion mode to the stratified combustion mode and a second direction from the stratified combustion mode to the homogeneous combustion mode; the controller advancing the swirl control changeover timing to effect a start of a changeover of the swirl control mode in advance of a changeover of the combustion control mode when the changeover direction is the first direction from the homogeneous combustion mode to the stratified combustion mode.

2. The engine control system according to claim 1 wherein the second system of the engine is an intake system for supplying an intake air into the engine, the intake system of the engine comprises a swirl control valve disposed in an intake passage leading to a cylinder of the engine, for controlling the swirl condition, and the controller produces a swirl control signal to control an opening degree of the swirl control valve to control the swirl condition in one of the stratifying mode and the homogenizing mode.

3. The engine control system as claimed in claim 1 wherein the controller retards the swirl control changeover timing to effect a start of a changeover of the swirl control mode later when the changeover direction is the second direction from the stratified mode to the homogeneous mode than when the changeover direction is the first direction from the homogeneous combustion mode to the stratified combustion mode.

4. The engine control system as claimed in claim 1 wherein the controller monitors an engine operating condition of the engine to detect occurrence of a combustion changeover request requesting changeover of the combustion control mode between the stratified and homogeneous combustion modes, sets the swirl control changeover timing at a time of occurrence of the combustion changeover request when the changeover direction is the first direction from the homogeneous combustion mode to the stratified combustion mode, and retards the swirl control changeover timing with respect to the time of occurrence of the combustion changeover request when the changeover direction is the second direction from the stratified mode to the homogenous mode.

5. The engine control system as claimed in claim 4 wherein the homogeneous combustion mode comprises a homogeneous stoichiometric mode and a homogeneous lean mode, the homogenizing mode comprises a first mode adapted to the homogeneous stoichiometric mode and a second mode adapted to the homogeneous lean mode, the controller sets the swirl control changeover timing at a time of actual changeover of the combustion control mode when the combustion changeover is from the stratified mode to the homogeneous lean mode, and defers a changeover of the swirl control mode to the second mode until a parameter representing a desired equivalent air fuel ratio becomes equal to or higher than a predetermined value when the combustion changeover is from the stratified combustion mode to the homogeneous stoichiometric mode.

6. The engine control system as claimed in claim 1 wherein the controller monitors an engine operating condition of the engine, and determines a requested combustion mode in accordance with the engine operating condition, and the controller sets the swirl control mode to the homogenizing mode only when the requested combustion mode is the homogeneous combustion mode and simultaneously the combustion control mode is set to the homogeneous combustion mode, and otherwise sets the swirl control mode to the stratifying mode.

7. An engine control system comprising:

an internal combustion engine comprising a first system for controlling a combustion condition in the engine by changing over a combustion control mode between a stratified combustion mode and a homogeneous combustion mode, and a second system for controlling a swirl condition of a swirl flow in the engine by regulating an intake air flow into the engine;

a controller for controlling the swirl condition of the engine to adapt the swirl condition to the combustion condition of the engine by changing over a swirl control mode between a stratifving mode for the stratified combustion mode and a homogenizing mode for the homogeneous combustion mode, and for changing a swirl control changeover timing of changeover of the swirl control mode between the stratifying mode and the homogenizing mode in accordance with a changeover direction which is one of a first direction from the homogeneous combustion mode to the stratified combustion mode and a second direction from the stratified combustion mode to the homogeneous combustion mode, wherein the second system of the engine is an intake system for supplying an intake air into the engine, the intake system of the engine comprises a swirl control valve disposed in an intake passage leading to a cylinder of the engine, for controlling the swirl condition, and the controller produces a swirl control signal to control an opening degree of the swirl control valve to control the swirl condition in one of the stratifying mode and the homogenizing mode; and an engine operating condition sensor for sensing an engine operating condition of the engine, and the controller determines the changeover direction by selecting, as a desired target combustion mode, one of the stratified combustion mode and the homogeneous combustion mode in accordance with the engine operating condition sensed by the sensor, advances the swirl control changeover timing to effect a start of a changeover of the swirl control mode between the stratifying mode and the homogenizing mode in advance of a changeover of the combustion control mode between the stratified combustion mode and the homogeneous combustion mode when the target combustion mode is the stratified combustion mode and the changeover direction is from the homogeneous combustion mode to the stratified combustion mode, and retards the swirl control changeover timing to delay a start of the changeover of the swirl control mode until the changeover of the combustion control mode when the target combustion mode is the homogeneous combustion mode and the changeover direction is from the stratified combustion mode to the homogeneous combustion mode.

8. The engine control system according to claim 7 wherein the stratifying mode is a mode for increasing a swirl flow in the engine, the homogenizing mode is a mode for decreasing a swirl flow in the engine, and the controller holds the swirl control mode in the stratifying mode during a transient interval from a target changeover time of changeover of the target combustion mode from one of the stratified combustion mode and the homogeneous combustion mode to the other of the stratified combustion mode and the homogeneous combustion mode, to a combustion changeover time of actual changeover of the combustion control mode from one of the stratified combustion mode and the homogeneous combustion mode to the other of the stratified combustion mode and the homogeneous combustion mode in response to the changeover of the target combustion mode both when the changeover direction is from the homogeneous combustion mode to the stratified combustion mode and when the changeover direction is from the stratified combustion mode to the homogeneous combustion mode.

9. The engine control system according to claim 8 wherein the controller is also for carrying out a changeover of the swirl control mode from the homogenizing mode to the stratifying mode by changing over a desired target opening of the swirl control valve from a second degree according to the homogenizing mode to a first degrees according to the stratifying mode immediately when the engine operating condition varies from a second condition region requiring the homogenous combustion mode to a first condition region requiring the stratified combustion mode, and carrying out a changeover of the swirl control mode from the stratifying mode to the homogenizing mode by changing over the desired target opening of the swirl control valve from the first degree to the second degree when the combustion control mode is changed over from the stratified combustion mode to the homogeneous combustion mode.

10. The engine control system according to claim 9 wherein the controller is also for producing a condition signal which is in a first signal state when the target combustion control mode and the actual combustion control mode are both the stratified combustion mode, in a second signal state when the target combustion control mode and the actual combustion control mode are both the homogeneous combustion mode, and in a third signal state when the target combustion control mode and the actual combustion control mode are different from each other, and sets the swirl control mode to the homogenizing mode only when the condition signal is in the second signal state.

11. The engine control system according to claim 10 wherein the homogeneous combustion mode comprises a rich combustion mode for controlling an air fuel ratio at a rich level and a lean combustion mode for controlling the air fuel ratio at a lean level leaner than the rich level, the homogenizing mode comprises a first mode suitable for the lean combustion mode and a second mode suitable for the rich combustion mode, and the controller is configured to select, as the target combustion mode, one of the stratified combustion mode, the lean combustion mode of the homogeneous combustion mode and the rich combustion mode of the homogeneous combustion mode and to adapt the swirl condition of the engine to the combustion condition of the engine by changing over the swirl control mode among the stratifying mode, the first mode and the second mode.

12. The engine control system according to claim 11 wherein the controller is also for allowing a delay of changeover of the swirl control mode to the second mode after an actual changeover of the combustion control mode to the rich combustion mode.

13. The engine control system according to claim 12 wherein the first system of the engine comprises a fuel control actuator for varying a fuel supply quantity to the engine to control an actual air fuel ratio to a desired air fuel ratio, and the controller effects a changeover of the swirl control mode from the stratifying mode to the first mode at a time of actual changeover of the combustion control mode from the stratified combustion mode to the lean combustion mode, and prevents a changeover of the swirl control mode to the second mode unless a parameter representative of the air fuel ratio is in a predetermined range.

14. The engine control system according to claim 9 wherein the first system of the engine comprises a fuel system which comprises a fuel injector for injecting fuel directly into the cylinder of the engine, the intake system of the engine comprises first and second intake ports for introducing the intake air into the cylinder of the engine, the swirl control valve is disposed in the intake passage at a position to regulate an intake air flow through the first intake port;

wherein the controller comprises a first section for changing over the combustion control mode between the stratified combustion mode and the homogeneous combustion mode by changing over a fuel injection timing between a first injection timing for the stratified combustion mode and a second injection timing for the homogeneous combustion mode, and a second section for changing over the swirl control mode between the stratifying mode and the homogenizing mode;

wherein the controller comprises a computer system comprising at least one central processing unit;

wherein the engine operating condition sensor comprises at least one of an engine load sensor for sensing an engine operating condition indicative of an engine load, and an engine speed sensor for sensing an engine operating condition indicative of an engine speed; and wherein the internal combustion engine comprises a plurality of the engine cylinders, and a plurality of the swirl control valves each assigned for a unique one of the engine cylinders.

15. An engine control process for an internal combustion engine comprising a first system for controlling a combustion condition in the engine by changing over a combustion control mode between a stratified combustion mode and a homogeneous combustion mode, and a second system for controlling a swirl condition of a swirl flow in the engine by regulating an intake air flow into the engine; the engine control process comprising:

a controlling step of controlling the swirl condition of the engine to adapt the swirl condition to the combustion condition of the engine by changing over a swirl control mode between a stratifying mode for the stratified combustion mode and a homogenizing mode for the homogeneous combustion mode; and a changing step of changing a swirl control changeover timing of changeover of the swirl control mode between the stratifying mode and the homogenizing mode in accordance with a changeover direction which is one of a first direction from the homogeneous combustion mode to the stratified combustion mode and a second direction from the stratified combustion mode to the homogeneous combustion mode, the swirl control changeover timing being advanced in the changing step to effect a start of a changeover of the swirl control mode in advance of a changeover of the combustion control mode when the changeover direction is the first direction from the homogeneous combustion mode to the stratified combustion mode.

16. The engine control process according to claim 13 wherein the controlling step comprises a control signal producing step of producing a swirl control signal, in one of the stratifying mode and the homogenizing mode, to control an opening degree of a swirl control valve disposed in an intake passage leading to a cylinder of the engine, for controlling the swirl condition in the engine.

17. An engine control process for an internal combustion engine comprising a first system for controlling a combustion condition in the engine by changing over a combustion control mode between a stratified combustion mode and a homogeneous combustion mode, and a second system for controlling a swirl condition of a swirl flow in the engine by regulating an intake air flow into the engine; the engine control process comprising:

a controlling step of controlling the swirl condition of the engine to adapt the swirl condition to the combustion condition of the engine by changing over a swirl control mode between a stratifying mode for the stratified combustion mode and a homogenizing mode for the homogeneous combustion mode; and a changing step of changing a swirl control changeover timing of changeover of the swirl control mode between the stratifying mode and the homogenizing mode in accordance with a changeover direction which is one of a first direction from the homogeneous combustion mode to the stratified combustion mode and a second direction from the stratified combustion mode to the homogeneous combustion mode;

wherein the controlling step comprises a control signal producing step of producing a swirl control signal, in one of the stratifying mode and the homogenizing mode, to control an opening degree of a swirl control valve disposed in an intake passage leading to a cylinder of the engine, for controlling the swirl condition in the engine;

wherein the changing step comprises a collecting step of collecting input information on a sensed engine operating condition, a selecting step of determining the changeover direction by selecting, as a desired target combustion mode, one of the stratified combustion mode and the homogeneous combustion mode in accordance with the engine operating condition, and a discriminating step of advancing the swirl control changeover timing to effect a start of a changeover of the swirl control mode between the stratifying mode and the homogenizing mode in advance of a changeover of the combustion control mode between the stratified combustion mode and the homogeneous combustion mode when the target combustion mode is the stratified combustion mode and the changeover direction is from the homogeneous combustion mode to the stratified combustion mode, and retarding the swirl control changeover timing to delay a start of the changeover of the swirl control mode until the changeover of the combustion control mode when the target combustion mode is the homogeneous combustion mode and the changeover direction is from the stratified combustion mode to the homogeneous combustion mode.

18. The engine control process according to claim 17 wherein the stratifying mode is a mode for increasing a swirl flow in the engine, the homogenizing mode is a mode for decreasing a swirl flow in the engine, and the swirl control mode is held in the stratifying mode during a transient interval from a target changeover time of changeover of the target combustion mode from one of the stratified combustion mode and the homogeneous combustion mode to the other of the stratified combustion mode and the homogeneous combustion mode, to a combustion changeover time of actual changeover of the combustion control mode from one of the stratified combustion mode and the homogeneous combustion mode to the other of the stratified combustion mode and the homogeneous combustion mode in response to the changeover of the target combustion mode both when the changeover direction is from the homogeneous combustion mode to the stratified combustion mode and when the changeover direction is from the stratified combustion mode to the homogeneous combustion mode.

19. The engine control process according to claim 18:
wherein a changeover of the swirl control mode from the homogenizing mode to the stratifying mode is carried out by changing over a desired target opening of the swirl control valve from a second degree according to the homogenizing mode to a first degree according to the stratifying mode immediately when the engine operating condition varies from a second condition region requiring the homogenous combustion mode to a first condition region requiring the stratified combustion mode, and a changeover of the swirl control mode from the stratifying mode to the homogenizing mode is carried out by changing over the desired target opening of the swirl control valve from the first degree to the second degree when the combustion control mode is changed over from the stratified combustion mode to the homogeneous combustion mode;
wherein the selecting comprises a step of producing a condition signal which is in a first signal state when the target combustion control mode and the actual combustion control mode are both the stratified combustion mode, in a second signal state when the target combustion control mode and the actual combustion control mode are both the homogeneous combustion mode, and in a third signal state when the target combustion control mode and the actual combustion control mode are different from each other, and the controlling step comprises a step of setting the swirl control mode to the homogenizing mode only when the condition signal is in the second signal state.

20. The engine control process according to claim 15:
wherein the homogeneous combustion mode comprises a rich combustion mode for controlling an air fuel ratio at a rich level and a lean combustion mode for controlling the air fuel ratio at a lean level leaner than the rich level, the homogenizing mode comprises a first mode suitable for the lean combustion mode and a second mode suitable for the rich combustion mode, and the selecting step comprises an operation of selecting, as the target combustion mode, one of the stratified combustion mode, the lean combustion mode of the homogeneous combustion mode and the rich combustion mode of the homogeneous combustion mode, to adapt the swirl condition of the engine to the combustion condition of the engine by changing over the swirl control mode among the stratifying mode, the first mode and the second mode;

wherein the discriminating step is arranged to allow a delay of changeover of the swirl control mode to the second mode after an actual changeover of the combustion control mode to the rich combustion mode; and wherein the discriminating step comprises a step of examining a parameter indicative of an air fuel ratio of the engine, and causing the swirl control mode to be changed over to effect a changeover of the swirl control mode from the stratifying mode to the first mode at a time of actual changeover of the combustion control mode from the stratified combustion mode to the lean combustion mode, and to prevent a changeover of the swirl control mode to the second mode unless the parameter indicative of the air fuel ratio is in a predetermined range.

21. An engine control system comprising:

an internal combustion engine comprising at least one engine cylinder;

a fuel injection system for controlling a combustion condition in the engine by injecting fuel into the engine in response to a combustion control signal which is in one of a first combustion control state for controlling the combustion condition in a stratified combustion mode and a second combustion control state for controlling the combustion condition in a homogeneous combustion mode;

an intake system comprising an intake air passage leading to the engine, and a swirl control valve disposed in the intake air passage, for controlling a swirl condition of a swirl flow in the engine in response to a swirl control signal which is in one of a first swirl control state for controlling the swirl condition in a strong swirl mode adapted to the stratified combustion mode, and a second swirl control state for controlling the swirl condition in a weak swirl mode adapted to the homogeneous combustion mode;

a sensor for collecting input information to determine an engine operating parameter indicative of an engine load by sensing a first engine operating condition; and a controller for controlling the combustion condition and the swirl condition in the engine by producing the combustion control signal and the swirl control signal in accordance with the engine operating parameter, the controller being connected with the sensor and configured to produce a condition signal which is in a first condition state when the engine operating parameter is in a predetermined lower engine load region and in a second condition state when the engine operating parameter is in a predetermined higher load region, the controller being further connected with the fuel system and configured to change over the combustion control signal between the first and second combustion control states so that the combustion control signal is in the first combustion control state when the condition signal is in the first condition state, and in the second combustion control state when the condition signal is in the second condition state, and the controller being further connected with the intake system and configured to effect a changeover of the swirl control signal from the second swirl control state to the first swirl control state in response to a changeover of the condition signal from the second condition state to the first condition state before a changeover of the combustion control signal from the second combustion control state to the first combustion control state, and to effect a changeover of the swirl control signal from the first swirl control state to the second swirl control state in response to a changeover of the combustion control signal from the first combustion control state to the second combustion control state with a delay after a changeover of the condition signal from the first condition state to the second condition state.

22. The engine control system according to claim 21 wherein the controller is also for holding the swirl control signal in the first swirl condition state during a transient interval from a changeover of the condition signal to a responsive changeover of the combustion control signal responsive to the changeover of the condition signal both when the changeover of the condition signal is from the second condition state to the first condition state and when the changeover of the condition signal is from the first condition state to the second condition state.

* * * * *